United States Patent [19]

Kenderi

[11] Patent Number: 5,281,856
[45] Date of Patent: Jan. 25, 1994

[54] WATER CURRENT ENERGY CONVERTER

[76] Inventor: Tibor Kenderi, Kelenhegyi ut 49, BudapestH-1118, Hungary

[21] Appl. No.: 856,032
[22] PCT Filed: Nov. 13, 1992
[86] PCT No.: PCT/HU90/00072
 § 371 Date: May 11, 1992
 § 102(e) Date: May 11, 1992
[87] PCT Pub. No.: WO91/07587
 PCT Pub. Date: May 30, 1991

[30] Foreign Application Priority Data

Nov. 15, 1989 [HU] Hungary ............................. 5918/89

[51] Int. Cl.⁵ ........................ F03B 13/12; F03B 15/02
[52] U.S. Cl. ...................................... 290/54; 290/43; 415/7
[58] Field of Search ............... 290/43, 54; 415/3.1, 415/7; 416/85

[56] References Cited

U.S. PATENT DOCUMENTS

| | | | |
|---|---|---|---|
| 61,362 | 1/1867 | Rowe | 415/7 |
| 328,593 | 10/1885 | Main | 415/7 |
| 852,022 | 4/1907 | Kirschweng | 415/7 |
| 2,501,696 | 3/1950 | Souczek | 290/43 |
| 3,986,787 | 10/1976 | Morton, Jr. et al. | 290/54 |
| 4,095,918 | 6/1978 | Mouton, Jr. et al. | 290/54 |
| 4,383,182 | 5/1983 | Bowley | 290/54 |

FOREIGN PATENT DOCUMENTS

| | | |
|---|---|---|
| 2635529 | 4/1977 | Fed. Rep. of Germany . |
| 2927776 | 1/1981 | Fed. Rep. of Germany . |
| 3404331 | 8/1985 | Fed. Rep. of Germany . |
| 288373 | 12/1987 | Japan ............... 415/3.1 |
| WO8705078 | 8/1987 | PCT Int'l Appl. . |
| 1624198 | 1/1991 | U.S.S.R. ............... 416/85 |

Primary Examiner—A. D. Pellinen
Assistant Examiner—Robert Lloyd Hoover
Attorney, Agent, or Firm—Michael D. Bednarek

[57] ABSTRACT

A water current energy converter designed for and capable of converting the flow energy of a moving body of water into electric power comprises at least one water driven flow machine, especially a water driven turbine, an electric power generator (19) and a hydraulic energy transfer system arranged between the water turbine(s) and the power generator (19). According to the invention in at least one thoroughfare flow duct (8) of a floating buoyant body (2) at least one pumping unit (10) comprising a hydraulic rotary pump (11, 12) coupled to a shaft of the water driven turbine is provided. The buoyant body (2) is held by anchoring means in a predetermined orientation and in substantially stationary position on the surface of the water. The hydraulic rotary pumps (11, 12) form component parts and serve as hydraulic pressure sources in the hydraulic energy transfer system.

19 Claims, 3 Drawing Sheets

WATER CURRENT ENERGY CONVERTER

FIELD AND BACKGROUND OF THE INVENTION

The present invention relates to a water current energy converter designed for and capable of converting the flow energy of a moving body of water into electric power, such converter comprising at least one water driven flow machine, especially a water turbine, an electric power generator, and a hydraulic energy transfer system arranged between said water turbine(s) and said power generator.

The known types of contemporary hydroelectric machines for generating electric power by making use of the flow energy of moving bodies of water embody the different types of water driven turbines that have been developed to highly sophisticated technical standard. With hitherto known such machines, maintaining a constant speed of revolution of the water driven turbines used for power generation is a primary requirement. The maintenance of constant speed can be effected by continuously adjusting, during operation, either the blade angle of the turbine propeller blades, or the wheel discharge of the turbine, the latter usually performed by turbine gate rigging, i.e. by continuously altering the position of baffle plates arranged within the inlet area of the turbine wheel passage. Both ways of speed control mentioned require elaborate and thus, expensive machinery with inherent tendency to operation failures, and also with losses of efficiency involved.

Another technical problem lies in the fact that an A.C. voltage of the frequency range between 50 to 54 Hz usually required for industrial purposes can only be generated by water driven turbines of a rated speed of 100 to 600 revolutions per minute if an electric power generator of considerable size, i.e. diameter, is coupled to the turbine shaft. Alternatively, a generator of reduced diameter should be driven by the water turbine via a speed reducing gear whereby mechanical efficiency is reduced by simultaneous increase of investment and maintenance expenditures. For the sake of example only, reference is made to an existing power plant situated at the mouth of the river Ronce in France where an electric power generator of the diameter of 4 meters is driven by an adjustable blade Kaplan-type turbine having an impeller of the diameter of 5.35 meters and operating at a rated speed of 93.75 revolutions per minute. Such and similar large size equipment can economically be used in connection with huge dams or weirs only. Such types of machinery are, however, completely excluded from possible use in all cases where the utilization of the energy of water flow, especially tidal currents of only 1 to 2 or even 4 to 5 meters in thickness of layer, and of up to 40 km per hour speed of advance is envisaged.

Water currents of such characteristics are occasionally several thousand meters wide and their estimated total energy content could be a multiple of that of the famous Niagara Falls. According to both, local observations and measured values, on the river Amasonas heavy break-ins of tidal current in the form of an advancing wall-like tidal surge speeding up to 40 km per hour against the river stream and having a height of 4.5 meters by a width of 12 km are quite common at times of sun-moon conjunction. Sources of literature refer to tidal surges observed at the mouth of the river Humber that occure twice a day with a flow speed up to 40 km per hour. In a distance of 10 km further upstream from the mouth, the height of the tidal wave could still be estimated to 2 meters. Similarly to this, the speed of the tidal current through the mouth of the river Seine has also been measured to 40 km per hour, and its height can also reach 2 meters. In certain areas between sea islands and in narrows tidal currents of higher speed than those mentioned above involving extremely huge masses of water have also been located. It is a well known experience to those familiar with navigation that in certain periods of flood tide, cargo vessels of minor or even average performance have their difficulty of passing the Straits of Gibraltar.

SUMMARY AND OBJECTS OF THE INVENTION

An object of the present invention is to provide an apparatus for capturing the energy contents of water currents of relatively low, e.g. of around one meter thickness of layer and of changing level. The apparatus according to the invention should be capable of utilizing the energy of currents present in bodies of surface waters such as currents of rivers of even small cross section but relatively high speed of flow, tidal currents, currents of different types of advancing waves like flood waves and other similar water body movements. Another object of the invention is to provide an apparatus which makes use of the energy of such bodies of water at relatively low investment and operational costs, and which is able to turn it into work producing form with high efficiency.

The above and other objects will be solved by a water current energy converter of the above-noted type in which at least one thoroughfare flow duct of a buoyant body having at least one pumping unit comprising a hydraulic rotary pump coupled to a shaft of a water driven turbine is provided. The buoyant body is held by suitable anchoring means in a pre-determined orientation and in a substantially stationary position in a moving surface water, preferably in a near-to-shore area of a sea or lake, or the mouth of a river so that it is allowed to freely follow changes i.e. the rise and fall of the surface water level. The at least one thoroughfare flow duct is provided in a substantially bottom part of the buoyant body so that it is constantly and entirely under the water level i.e. immersed in water when the buoyant body is in its floating, anchored position of operation. The hydraulic rotary pump forms a component part and serves as a hydraulic pressure source in a hydraulic energy transfer system that comprises, among other parts, a hydroengine that is drivingly coupled to a power generator which, together with the pumping unit and the whole hydraulic energy transfer system is located within the buoyant body.

In preferred embodiments of the invention the buoyant body is a substantially rigid thin-shell structure of streamlined, elongate shape when viewed in a direction that is co-axial with the at least one thoroughfare flow duct. Its shape is further mirror symmetrical to cross sections taken through the buoyant body along both a longitudinal and a transverse vertical imaginary plane. The buoyant body has fastening portions, preferably four in number that are suitable for being connected to the anchoring means and are arranged pairwise on both sides and equally distanced from both ends of the buoyant body. The above arrangement of the fastening portions ensures that the pre-determined orientation of the buoyant body remains maintained even in the case if one of the four anchoring means (which can be provided by any suitable rope, chaine or cable) ceases to withstand load and dynamic stress. The arrangement of the fastening portions together with the streamlined shape of the buoyant body further results in an increased excellent resistivity of the buoyant body and thus, of the energy converter against wind load and shocks that are exercised by masses of water splashing against said body under stormy weather conditions.

In further preferred embodiments of the invention the buoyant body is a shape-retentive thin-shell structure substantially made of preferably reinforced synthetic resin. It comprises at its bottom a longitudinal keel of convex U-shape, at both sides along the bottom of its end portions a pair of thinner longitudinal ribs of convex U-shape, on its upper side at both ends respective deck lids of substantially streamlined shape, and a removable cover between the deck lids. The latter is, along its matching edges, hermetically joinable to matching surfaces of the buoyant body. Resulting from the above characteristic features, the present invention provides a substantially rigid housing for the floating energy converter. Said housing is of high durability and enables easy access to all functional component parts of the converter especially for service and maintenance purposes. Such buoyant bodies are relatively easy to manufacture by using well-known techniques.

In still further preferred embodiments of the invention each thoroughfare flow duct consists of a substantially cylindrical middle duct section laid out for and capable of housing the pumping units, and of adjoining, identically shaped outer duct sections that are of broadening cross section towards in-or outlet openings of the flow duct. Such in-or outlet openings are arranged, respectively, at opposite ends of the elongate buoyant body. Such preferred embodiments make use of the well-known principle of using diffuser and confuser sections in flow channels of turbines for better current energy utilization.

In embodiments of the present invention the substantially cylindrical middle duct section of the flow duct preferably comprises a tubular steel house for fastening and holding the pumping unit. The tubular steel house may, at least in preferred embodiments, be a steel structure consisting of a pair of matching half-cylindric tube portions. Such embodiments allow for easy mounting of and easy access to the pumping units with simultaneous increase of the strength and rigidity. From viewpoints of optimum cost and rated performance per unit embodiments provided with a pair of thoroughfare flow ducts in parallel twinlike arrangement have proved to be an optimum solution. In preferred further embodiments of the invention the pumping units of the energy converter comprise a water driven turbine having an impeller with rigid, non-adjustable blades and a hydraulic rotary pump that is drivingly coupled to the shaft of the impeller of the water driven turbine. The hydraulic rotary pump is capable of pumping and pressurizing a suitable hydraulic fluid in both senses of rotation. Such embodiments are of relatively low investment cost and allow, when anchored and duly oriented in surface water areas of alternating water current, for their operation in both directions of water flow with identical operational characteristics and efficiency.

For the sake of easy maintenance and repair, in preferred embodiments of the invention the pumping units are designed and constructed as modular units built in interchangeably in the substantially cylindrical middle sections of the thoroughfare flow ducts of the buoyant body. Such embodiments of the invention allow for regular maintenance by replacing the pumping units at pre-determined regular intervals so that inspection and repair works can be performed on shore and independently from normal operation.

As already mentioned further above, the water current energy converter according to the present invention also comprises a hydraulic energy transfer system which is arranged between the water turbine(s) and the power generator. With today's techniques, such hydraulic energy transfer systems can be designed and realized in a large number of different embodiments. The main object of this hydraulic energy transfer system is to provide constant and uniform operational characteristics, especially pressure and flow rate of the hydraulic fluid, preferably hydraulic oil, for a hydroengine by which the power generator of the energy converter is driven. The operational characteristics mentioned should be maintained independently from the characteristics of the water driven turbines, such characteristics varying in both, speed of rotation and rated torque during operation.

In one preferred embodiment of the water current energy converter according to the present invention the hydraulic energy transfer system comprises the hydraulic rotary pumps of the pumping units, a delivery duct and an induction pipe. Both of them are, via a valve array, connected to the hydraulic rotary pumps. The hydraulic energy transfer system further comprises a safety relief valve, at least one hydropneumatic pressure storage tank, a flow control valve and a container for a suitable hydraulic fluid, preferably hydraulic oil. The at least one pressure storage tank is connected to a pressure tube leading from the safety relief valve to an inlet of the flow control valve. An inlet of the safety relief valve is connected to the delivery duct, and a first outlet of the flow control valve is connected to a discharge pipe that supplies a controlled flow of the hydraulic fluid to the hydroengine. The container is connected to the induction pipe, via a return line to a relief outlet of the safety relief valve, through a return pipe to a second outlet of the flow control valve, and through a collecting main to an exhaust outlet of the hydroengine.

The valve array mentioned above comprises a circuit of flow actuated automatic check valves. The circuit is inserted between joining nipples for supplying and discharging the hydraulic fluid to and from the hydraulic rotary pumps on one hand, and the delivery duct and the induction pipe on the other hand. The valve array is designed for and capable of directing the flow of the hydraulic fluid into the delivery duct from the hydraulic rotary pumps in both senses of their rotation.

BRIEF DESCRIPTION OF THE DRAWING

The invention will become more readily apparent from the following description of a preferred embodiment thereof with reference to the accompanying drawings, in which.

DESCRIPTION OF THE PREFERRED EMBODIMENT

Figure 1:
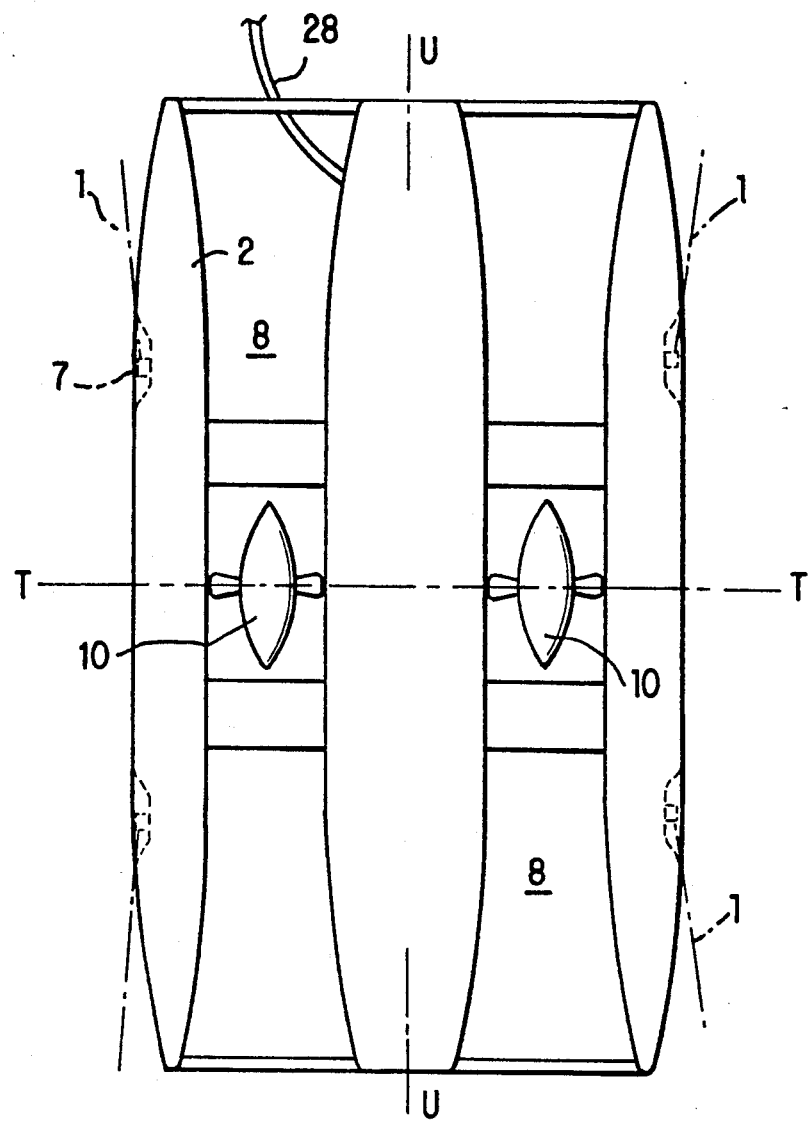
FIG. 1 is a simplified schematic top view of a preferred embodiment of the present invention where the deck lids and cover of the upper side are removed.
Figure 4:
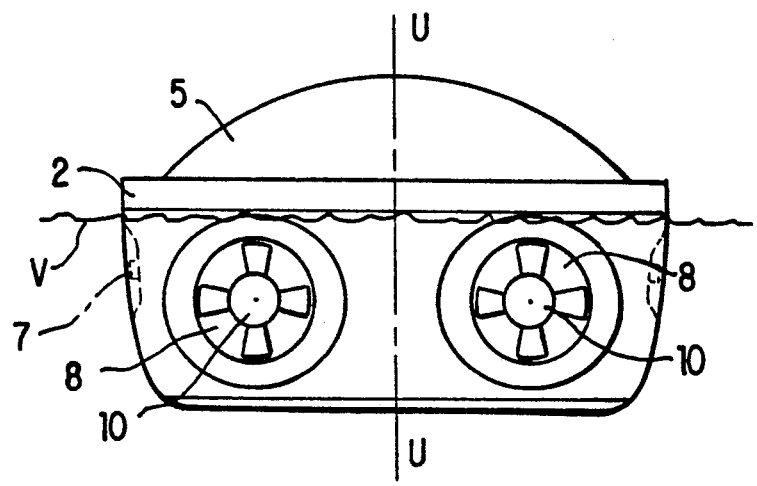
FIG. 4 is a partial cross section of the buoyant body of the embodiment taken in part along a plane 4—4 as shown in FIG. 2.

The attached drawing figures illustrate a preferred embodiment of the water current energy converter according to the present invention. A buoyant body 2 having two co-parallel thoroughfare flow ducts 8 in a twinlike arrangement is held by four anchoring means 1 attached to fastening portions 7 in pre-determined orientation and in a substantially stationary position in a surface water, preferably in a near-to-shore area of a sea or a lake or in the mouth of a river where substantially continuous or alternating water current is present. The four anchoring means 1 are preferably steel cables or chains which allow the floating buoyant body 2 to freely follow changes i.e. the rise and fall of the surface water level indicated by reference sign V while its orientation is substantially maintained. The buoyant body 2 is a substantially rigid thin-shell structure of streamlined, elongate shape when viewed in centerline direction of the flow ducts 8, and its elongate shape is mirror symmetrical to cross-sections taken through the buoyant body 2 along both a longitudinal vertical imaginary plane U and a transversal vertical imaginary plane T. The buoyant body 2 has altogether four fastening portions 7 that are suitable for being connected to the anchoring means 1 mentioned further above. The fastening portions 7 are arranged pairwise on both sides and equally distanced from both ends of the buoyant body 2. According to an important characteristic feature of the invention the buoyant body 2 is shaped and laid out in a manner that it has, when floating ready equipped and filled up for normal operation, a flotation line at which the thoroughfare flow ducts 8 are fully and entirely immersed in water.

In order to have sufficient load capacity and substantial strength, the shape-retentive thin-shell structure of the buoyant body 2 is substantially made of fibre reinforced synthetic resin, and it comprises at its bottom a longitudinal keel 3 of convex U-shape, a pair of thinner longitudinal ribs 4 of convex U-shape at both sides along the bottom of its end portions, respective deck lids 5 of substantially streamlined shape on its upper side at both ends, and a removable cover 6 between the deck lids 5 which is, along its matching edges, hermetically joinable to matching surfaces of the buoyant body 2. By removing the cover 6 free access to important functional component parts of the energy converter is provided while with the cover 6 closed, the inner portion of the buoyant body 2 is closed and sealed hermetically.

Figure 2:
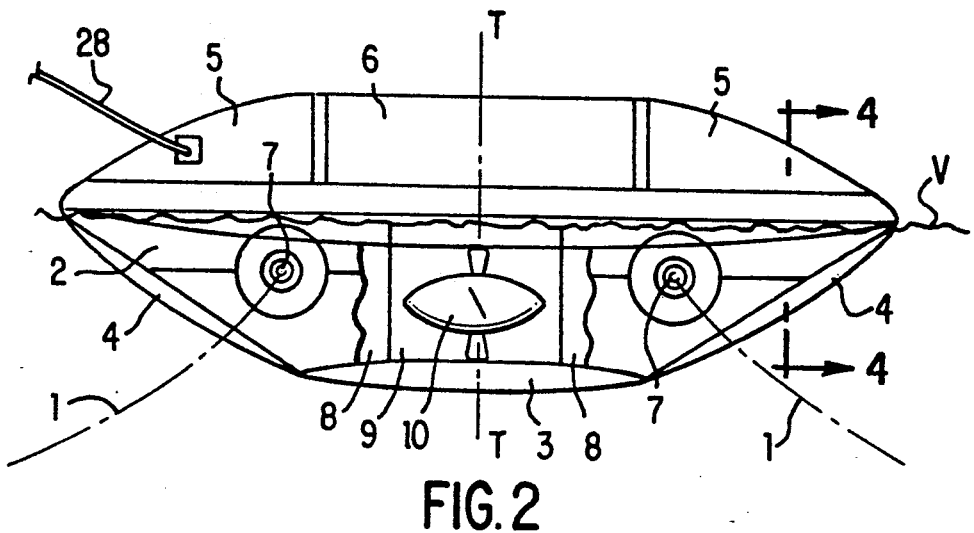
FIG. 2 is a simplified schematic side view, partly in section, of the embodiment shown in FIG. 1.
Figure 3:
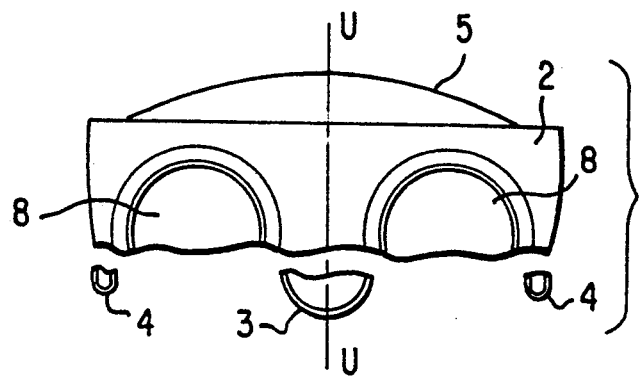
FIG. 3 is a schematic end view of the embodiment shown in FIGS. 1 and 2.

As best shown in FIG. 2, each thoroughfare flow duct 8 consists of a cylindrical middle duct section laid out for and capable of housing a pumping unit 10, and of adjoining, identically shaped outer duct sections that are of broadening cross section towards in- or outlet openings of the flow duct 8 whereby a so called confuser and diffuser for improved turbine efficiency is provided, respectively. In the embodiment shown in the accompanying drawings the pumping units 10 are interchangeable modular units that are, designed and constructed together with a tubular steel house 9, built in the cylindrical middle duct section of the flow duct 8. The steel house 9 preferably comprises a steel structure formed of a pair of matching half-cylindric tube portions. Each pumping unit 10 comprises a water driven turbine having an impeller with rigid, non-adjustable blades and a hydraulic rotary pump 11 or 12 drivingly coupled to the shaft of the impeller of the water driven turbine. The hydraulic rotary pumps 11, 12 are preferably gear pumps, and they are of the type capable of pumping and pressurizing the hydraulic fluid in both senses of their rotation. The hydraulic rotary pumps 11, 12 are encased in a streamlined housing of low flow resistance.

Figure 5:
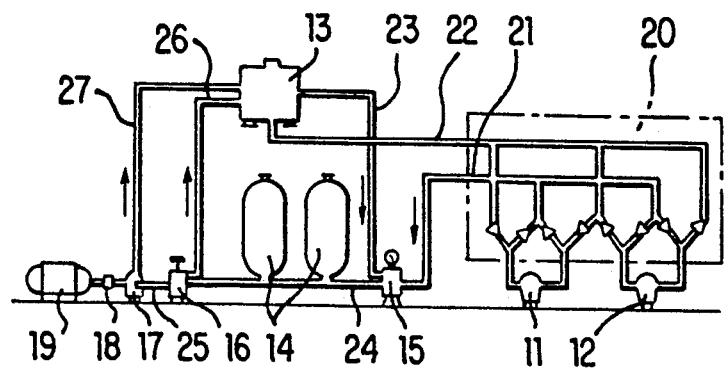
FIG. 5 is a schematic block diagram of the hydraulic energy transfer system of the embodiment shown in FIGS. 1 to 4, and FIGS. 6 and 7 show the arrangement of the functional component parts of the hydraulic energy transfer system shown in FIG. 5 in the embodiment of the energy converter according to the present invention in schematic side and top view, respectively.
Figure 6:
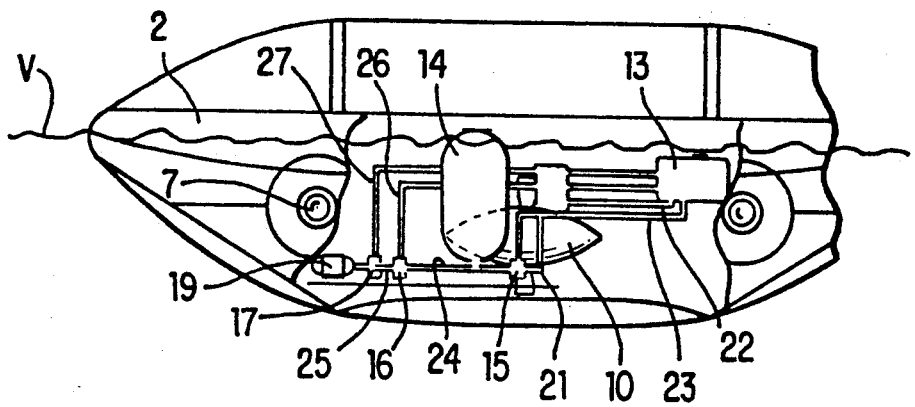
Figure 7:
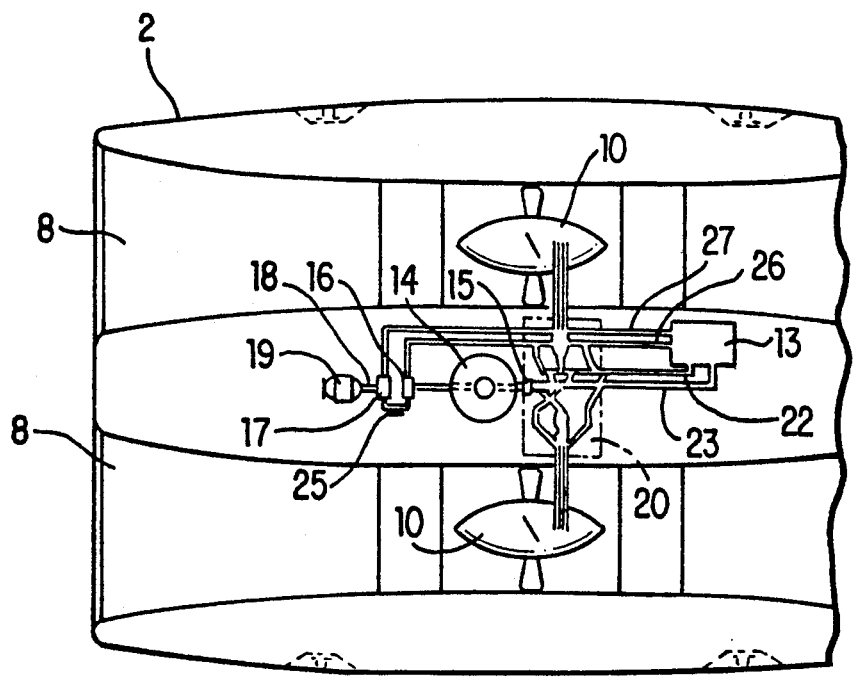

The hydraulic rotary pumps 11, 12 form component parts and serve as hydraulic pressure sources in the energy transfer system of the water current energy converter. The main components of this system and their functional interconnection are best shown in FIG. 5 while FIGS. 6 and 7 show their arrangement within the preferred embodiment described further above in detail.

The hydraulic energy transfer system also comprises a hydroengine 17 that is drivingly coupled, via coupling 18, to a power generator 19 which, together with the pumping units 10 and the hydraulic energy transfer system, is located in the inside of the buoyant body 2. Main functional component parts of the hydraulic energy transfer system are the hydraulic rotary pumps 11, 12 of the pumping units 10, a delivery duct 21 and an induction pipe 22 that are connected, via a valve array 20, to the hydraulic rotary pumps 11,12. This system further comprises a safety relief valve 15, two hydropneumatic pressure storage tanks 14, a flow control valve 16 and a container 13 for the hydraulic fluid, preferably oil, whereby the system is operated. Both pressure storage tanks 14 are connected to a pressure tube 24 interconnecting the safety relief valve 15 with an inlet of the flow control valve 16. An inlet of the safety relief valve 15 is connected to the delivery duct 21, and a first outlet of the flow control valve is connected to a discharge pipe 25 through which a controlled flow of the hydraulic fluid is supplied to the hydroengine 17. The container 13 is connected to the induction pipe 22, to a relief outlet of the safety relief valve 15 via a return line 23, to a second outlet of the flow control valve 16 through a return pipe 26, and to the exhaust outlet of the hydroengine 17 via collecting main 27. The valve array 20 comprises a circuit of flow actuated automatic check valves. The valve array 20 is inserted between joining nipples for supplying and discharging the hydraulic fluid to and from the hydraulic rotary pumps 11, 12 on one hand, and the delivery duct 21 and the induction pipe 22 on the other. The valve array 20 is in charge of directing the flow of the pressurized hydraulic fluid into the delivery duct 21 from the hydraulic rotary pumps 11, 12 in both senses of their rotation.

A first pilot embodiment of the water current energy converter according to the present invention has a total length of 3 meters and is 1.8 meters in width and 1 meter in height by a draught of 0.6 meter. The built-in water turbines for driving the hydraulic rotary pumps of the pumping units have a wheel diameter of approximately 0.4 meter, and the rated power of such a converter has been estimated to 6.5 kWh for experimental purposes. Another, probably final embodiment of the present invention with twin flow ducts and the dimensions of 5.4 meters in length, 2.4 meters in width and 1.7 meters in height, having water turbines with wheel (impeller) diameter of 0.8 meter and a draught of 1.1 meters by an expected rated electrical power output of 150 kWh is in advanced stage under design.

Water current energy converters according to the present invention can be operated either individually or in groups, each group consisting of a certain number of individual converters. They are connected, directly or indirectly with an on-shore control station of a power plant for electric power distribution. Their interconnections and said connection with the on-shore control station can be provided via electric cables, 28 and the latter may, besides cables for power transmission, also comprise lines for the transmission of telemetric data for plant control and supervision.

Some of the main, outstanding advantages of the water current energy converter according to the present invention can be listed as follows:

The pumping units which are arranged in the cylindrical middle section of the flow ducts contain hydraulic rotary pumps of small diameter. They are encased in a streamlined housing the diameter of which is approximately equal to that necessary for the bearing supports of the water turbine. Thus, a compact design and construction of low flow resistance for the pumping units is provided which results in high efficiency. The water turbine fully utilizes the energy content of the water flow through the flow duct since such water flow is neither diverted nor throttled or choked. No elaborate machinery for turbine speed control is needed. The invention allows for the utilization of water currents of very small e.g. 0.5 meter thickness of layer. Since it is positioned and held stationary in a manner so that changes of the surface water level are followed, it utilizes the energy content of the near-surface water current which is of maximum speed. The water current energy converter is capable of utilizing the flow of water from both longitudinal directions. Thus, tidal currents and wave currents coming from both directions are fully used for power generation. The embodiments of the invention are of streamlined, fish-like shape. This results in high resistivity to load impacts generated by wind and moving masses of water. It is expected that the water current energy converter will, when in operation, successfully withstand even 20 to 30 meters high so called "killer waves."

All component parts used in embodiments of the invention are units of high reliability that have been manufactured and marketed in big series for a long time. Their long service life and durability are key factors for smooth operation and easy maintenance.

Various other alternatives to the above specific embodiment of the invention, especially to the number of flow ducts, the components of the hydraulic energy transfer system, the design and shape of the buoyant body etc. are possible and it is not intended to limit the scope of the present invention beyond what is set forth in the claims recited below.

What is claimed is:

1. A water current energy converter designed for and capable of converting the flow energy of a moving body of water into electric power, comprising:
   at least one water driven turbine:
   an electric power generator (19); and
   a hydraulic energy transfer system arranged between said at least one water turbine and said electric power generator (19);
   wherein in at least one thoroughfare flow duct (8) of a floating, buoyant body (2) of substantially rigid thin-shell structure of streamlined, elongate shape when viewed in a direction that is co-axial with said at least one thoroughfare flow duct (8), and mirror symmetrical to cross sections taken through said buoyant body (2) along both a longitudinal and a transverse vertical imaginary plane (T,U), respectively, at least one pumping unit (10) comprising at least one hydraulic rotary pump (11,12) coupled to a shaft of said at least one water driven turbine is provided, said buoyant body (2) being held by anchoring means (1) in pre-determined orientation and in substantially stationary position in said moving body of water so that it is allowed to freely follow the rise and fall of the surface water level (V), said at least one thoroughfare flow duct (8) being provided in a substantially bottom part of said buoyant body (2) so that it is constantly and entirely under the water level (V) when said buoyant body (2) is in its floating, anchored position of operation; said at least one hydraulic rotary pump (11,12) forming a component part and serving as a hydraulic pressure source in said hydraulic energy transfer system, and a hydroengine (17) that is drivingly coupled to said power generator (19) which, together with said pumping unit (10) and said hydraulic energy transfer system, is located within said buoyant body (2);
   and further wherein said at least one hydraulic rotary pump (11,12) of said at least one pumping unit (10) being capable of pumping and pressurizing a suitable hydraulic fluid in both directions of its rotation, and said hydraulic energy transfer system further comprising at least one preferably hydropneumatic pressure storage tank (14) connected to a pressure tube (24) which is connected to an output from said at least one pumping unit (10), said pressure tube (24) supplying a controlled flow of the hydraulic fluid to the hydroengine (17) through a flow control valve (16) for driving said electric power generator at a constant speed despite variations in the speed and direction of said moving body of water.

2. A water current energy converter as claimed in claim 1, wherein a delivery duct (21) and an induction pipe (22) are connected to the at least one hydraulic rotary pump (11,12) via a valve array (20) which is capable of directing the flow of the hydraulic fluid into the delivery duct (21) from said at least one hydraulic rotary pump (11,12) in both directions of rotation of the latter.

3. A water current energy converter as claimed in claim 2, wherein said valve array (20) comprises a circuit of flow activated automatic check valves, and is inserted between joining nipples for supplying and discharging the hydraulic fluid to and from said at least one hydraulic rotary pump (11,12).

4. A water current energy converter as claimed in one of claims 2 or 3, wherein the hydraulic energy transfer system further comprises a safety relief valve (15) and a container (13) for the hydraulic fluid, and wherein said at least one hydropneumatic pressure storage tank (14) is connected to said pressure tube (24) leading from said safety relief valve (15) to an inlet of said flow control valve (16); and inlet of said safety relief valve (15) being connected to the delivery duct (21), and a first outlet of the flow control valve (16) being connected to a discharge pipe (25) through which the controlled flow of the hydraulic fluid is supplied to the hydroengine (17); while said container (13) is connected to said induction pipe (22), via a return line (23) to a relief outlet of said safety relief valve (15), through a return pipe (26) to a second outlet of the flow control valve (16), and through a collecting main (27) to an exhaust outlet of the hydroengine (17).

5. A water current energy converter as claimed in claim 1, wherein said buoyant body (2) has fastening portions (7) suitable for being connected to the anchoring means (1), said fastening portions (7) being arranged pairwise on both sides and equally distanced from both ends of said buoyant body (2), and wherein said buoyant body (2) is further shaped and laid out so as to have, when floating ready equipped and filled up with hydraulic fluid for normal operation, a flotation line at which said at least one thoroughfare flow duct (8) is fully and entirely immersed in water.

6. A water current energy converter as claimed in claim 5, wherein said buoyant body (2) is a shape-retentive thin-shell structure substantially made of preferably fibre reinforced synthetic resin and comprising, at its bottom a longitudinal keel (3) of convex U-shape in cross-section, and a pair of thinner longitudinal ribs (4) of likewise U-shape in cross-section at both sides along the bottom of its end portions, respective deck lids (5) of substantially streamlined shape on its upper side at both ends, and a removable cover (6) between said deck lids (5) which is, along its matching edges, hermetically joinable to matching edges of said buoyant body (2) and of the deck lids (5).

7. A water current energy converter as claimed in claim 1, wherein said at least one thoroughfare flow duct (8) of the buoyant body (2) comprises a substantially cylindrical middle duct section laid out for and capable of housing said at least one pumping unit (10), and of adjoining, identically shaped outer duct sections that are of broadening cross section towards inlet and outlet openings of said at least one flow duct (8), said inlet and outlet openings being arranged, respectively, at opposite ends of said buoyant body (2).

8. A water current energy converter as claimed in claim 7, wherein said substantially cylindrical middle duct section comprises a tubular steel house (9) for fastening and holding said at least one pumping unit (10), said tubular steel house (9) being a steel structure comprising a pair of matching half-cylindric tube portions.

9. A water current energy converter as claimed in claim 1, wherein said water driven turbine comprises an impeller with rigid, non-adjustable blades, and said at least one hydraulic rotary pump (11 or 12) is drivingly coupled to a shaft of said impeller of said water driven turbine, and wherein said at least one hydraulic rotary pump (11 or 12) is encased in a substantially streamlined housing equipped with suitable joining nipples for supplying and discharging, respectively, the hydraulic fluid to and from said at least one hydraulic rotary pump (11 or 12).

10. A water current energy converter as claimed in one of claims 7, 8 or 9, wherein said at least one pumping unit (10) is designed and constructed as a modular unit that is built in interchangeably in said substantially cylindrical middle section of said at least one thoroughfare flow duct (8) of said buoyant body (2).

11. A water current energy converter for converting the flow energy of a moving body of water into electric power, comprising:
at least one water driven turbine;
means for positioning said at least one water driven turbine in a pre-determined orientation within said moving body of water;
an electric power generator; and
a hydraulic energy transfer system operatively arranged between said at least one water driven turbine and said electric power generator;
wherein said hydraulic energy transfer system comprises a rotary pumping unit mechanically coupled to a shaft of said at least one water driven turbine, at least one hydropneumatic pressure storage tank hydraulically connected to an output of said rotary pumping unit, a hydroengine hydraulically connected to an output of said at least one pressure storage tank and drivingly coupled to said electric power generator, and a flow control means for controlling the flow of hydraulic fluid from said rotary pumping unit and said at least one pressure storage tank to said hydroengine for driving said electric power generator at a constant speed despite variations in the speed and direction of said moving body of water.

12. A water current energy converter as defined in claim 11, wherein said controlling means includes a flow control valve connected between the output of said at least one pressure storage tank and said hydroengine.

13. A water current energy converter as defined in claim 12, wherein said hydraulic energy transfer system further comprises a safety relief valve connected between the output of said rotary pumping unit and said at least one pressure storage tank.

14. A water current energy converter as defined in claim 13, wherein said hydraulic energy transfer system further comprises a supply container for supplying hydraulic fluid to an input of said rotary pumping unit, said supply container being hydraulically connected with outputs of said safety relief valve, said flow control valve, and said hydroengine, respectively.

15. A water current energy converter as defined in claim 14, wherein said at least one water driven turbine comprises an impeller with rigid, non-adjustable blades.

16. A water current energy converter as defined in claim 14, wherein said means for positioning said at least one turbine in a pre-determined orientation within said moving body of water comprises a buoyant body provided with at least one thoroughfare flow duct and a plurality of anchoring members for maintaining said buoyant body in a substantially stationary position in said moving body of water.

17. A water current energy converter for converting the flow energy of a moving body of water into electric power, comprising:
at least one water driven turbine;
a buoyant body for positioning said at least one water driven turbine in a pre-determined orientation within said moving body of water;
an electric power generator; and
a hydraulic energy transfer system operatively arranged between said at least one water driven turbine and said electric power generator;

wherein said hydraulic energy transfer system comprises a rotary pumping unit mechanically coupled to a shaft of said at least one water driven turbine, at least one hydropneumatic pressure storage tank hydraulically connected to an output of said rotary pumping unit, a hydroengine hydraulically connected to an output of said at least one pressure storage tank and drivingly coupled to said electric power generator, and a flow control valve connected between the output of said at least one pressure storage tank and said hydroengine to control the flow of hydraulic fluid to said hydroengine for driving said electric power generator at a constant speed despite variations in the speed and direction of said moving body of water.

18. A water current energy converter as defined in claim 12, wherein said hydraulic energy transfer system further comprises a safety relief valve connected between the output of said rotary pumping unit and said at least one pressure storage tank.

19. A water current energy converter as defined in claim 13, wherein said hydraulic energy transfer system further comprises a supply container for supplying hydraulic fluid to an input of said rotary pumping unit, said supply container being hydraulically connected with outputs of said safety relief valve, said flow control valve, and said hydroengine, respectively.

* * * * *